June 16, 1953     J. L. ELKINS     2,642,560
ROTATABLE WELDING GROUND CLAMP
Filed Sept. 27, 1949
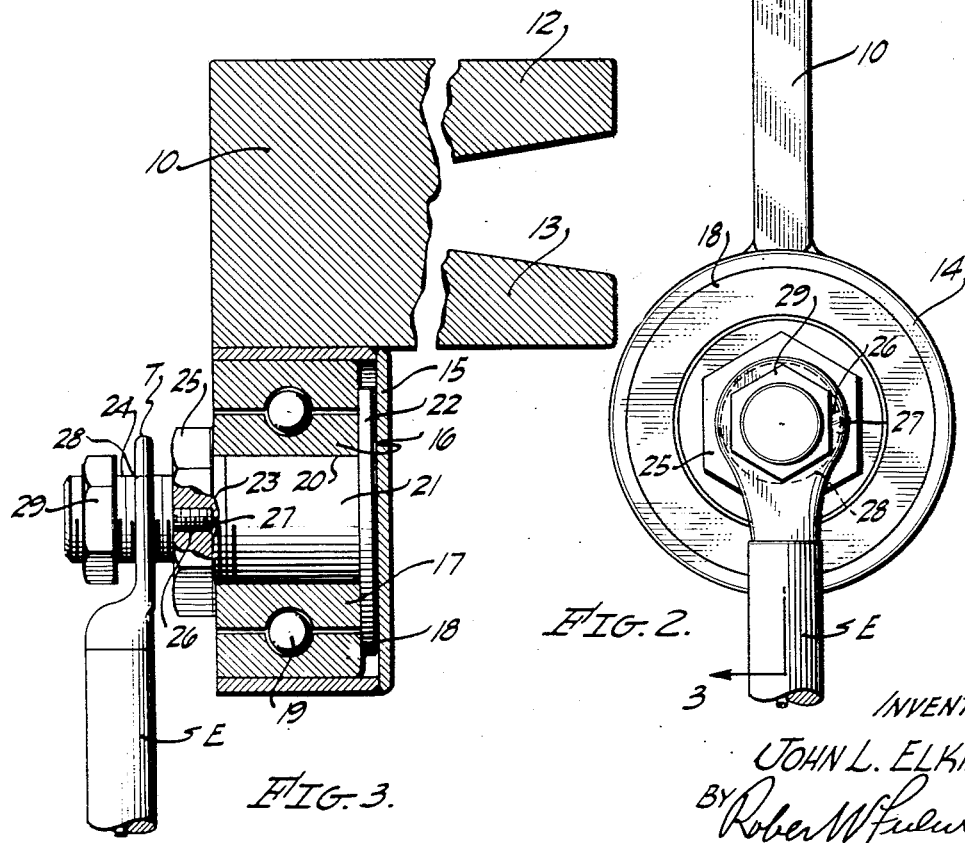
INVENTOR.
JOHN L. ELKINS,
BY Robert W. Fulwider
ATTORNEY.

Patented June 16, 1953

2,642,560

UNITED STATES PATENT OFFICE 2,642,560

ROTATABLE WELDING GROUND CLAMP

John L. Elkins, Long Beach, Calif.

Application September 27, 1949, Serial No. 118,110

2 Claims. (Cl. 339—8)

My invention relates to the field of clamping devices, and more particularly to a welding clamp adapted to removably affix a ground wire to a pipe during the course of an electric welding operation in such a manner that the pipe can be rotated on its longitudinal axis without twisting or otherwise deforming the ground wire.

Although several clamping devices have been devised and marketed in the past to permit a ground wire to be removably affixed to a pipe during the time that an electric welding operation is being performed thereon, the majority of these devices have maintained the ground wire in a fixed relationship with the pipe, with the result that as the pipe is rotated during a welding operation the ground wire become twisted and kinked. It will be apparent that such clamps are highly unsatisfactory, not only from the standpoint of damaging the ground wire due to twisting and kinking, but in diverting the welder's attention from his work to watching the ground wire to see that it is not twisted during the time the pipe is being rotated. Upon the ground wire being kinked or twisted, it frequently is damaged by having one or more of the electrical conducting strands situated therein broken, with the result that the remaining strands in the cable are subjected to carrying a heavier electric load than that for which they are designed.

The purpose of my invention is to provide a welding clamp that will eliminate the above named disadvantages.

A major object of my invention is to supply a welding clamp that may be removably affixed to a pipe, a flange, or other fitting mounted thereon, and when so positioned will permit the pipe to be rotated on its longitudinal axis without in any way twisting or deforming the electrical ground wire which is affixed to the clamp.

Another object of my invention is to supply a welding clamp having a simple mechanical structure, that can be fabricated from inexpensive commercially available materials, can be assembled by semi-skilled personnel, and as a result of its relatively low cost of production may be sold on a competitive price basis with other clamps to encourage its widespread use in the electric welding industry.

A further object of my invention is to furnish a welding clamp that occupies a minimum of space when not in use, requires a minimum of maintenance attention, and can be used in dusty and wet areas without fear of electric arcing occurring within the confines of the device due to foreign material being present therein.

These and other objects and advantages of my invention will become apparent from the following description of a preferred form thereof, and from the drawing illustrating that form in which:

Figure 1 is a perspective view of my welding clamp removably affixed to the end portion of a pipe;

Figure 2 is an end elevational view of the device; and

Figure 3 is a combined vertical cross-sectional and side elevational view of the device taken on the line 3—3 of Figure 2.

Referring now to Figures 1 and 3 for the general arrangement of my invention, it will be seen that it includes a clamp C which is used in removably affixing the device to the end portion of a pipe P which is shown in phantom line. Affixed to the end portion of the clamp C is a cylindrical housing H that serves to rotatably support a threaded member M to which the terminal T on the electric ground cable E is connected.

Although a wide variety of clamps C may be used in supporting my invention on the end portion of the pipe P or a flange affixed thereto (not shown), I have found that the clamp C is preferably formed from a rectangular plate of rigid material 10 having a V-shaped notch 11 extending rearwardly from the forward edge thereof. The notch results in two jaws 12 and 13 being formed in the plate 10 that removably grasp the side walls of the pipe P therebetween when the jaws are forcibly caused to engage same. It will be apparent that the same result can be accomplished by using two or more laterally spaced rods (not shown) having resilient characteristics, with the wires being so arranged as to provide an opening at the free ends thereof, and the rods extending rearwardly at an angle to be joined together in a conventional manner. In such an arrangement the rods function as the jaws 12 and 13 illustrated in Figure 1.

In Figures 2 and 3 it will be seen that the housing H is cylindrical in shape, and is preferably formed from a tubular member 14 of annular cross section to which a plate 15 is welded or otherwise affixed on one end thereof. Should it be desired, the clamp C as well as the housing H can be cast as an integral unit from a suitable electrical conducting material. In the form of my invention shown in Figure 3 the housing H is preferably welded to the lower edge of the plate 10, or supported therefrom in a conventional manner.

The interior of the tubular member 14 is adapted to slidably receive and hold a ball bearing assembly 16 that includes an inner and outer ball race 17 and 18 respectively, of a conventional design, with balls 19 situated therebetween. The ball bearing assembly 16 is held in position in the tubular member 14 by fitting snugly therein, and due to the machining of the interior of the member 14 can be inserted but a predetermined distance for reasons which will hereinafter be apparent.

The rotatable member M is supported in a bore 20 formed in the inner ball race 17, with a member M including a shaft portion 21 of annular cross section having an annular flange 22 formed on the forward end thereof. The shaft 21 on its rearward end develops into a threaded portion 23 of somewhat smaller diameter, with this portion terminating in a threaded bolt portion 24.

In Figure 3 it will be seen that the member M is positioned in the ball bearing assembly 16, with the flange 22 positioned on the forward face thereof, and the bolt portion 24 extending rearwardly from the assembly. When thus assembled it will be noted that the forward face of the flange 22 is maintained a short distance from the rearward face of the plate 15, due to the ball bearing assembly 16 being insertible in the housing H but a predetermined distance. The adjustment of the flange 22 relative to the plate 15 is controlled by having a standard nut 25 engage the threaded portion 23. A tapped bore 26 is formed in both the threaded shaft portion 23 and the nut 25, and when a lock screw 27 is caused to engage the bore the threaded shaft portion and nut are held together in the desired relationship. The nut 25 as may best be seen in Figure 3 has the forward face thereof in contact with the rearward face of the ball race 17, with the result that the nut 25 prevents longitudinal movement of the rotatable member M. The terminal T on the cable E is provided with an eye 28 which is engaged by the bolt 24, and when a nut 29 is threaded on the bolt 24 the cable C is firmly held between the nuts 25 and 29.

The operation of my invention is extremely simple. The clamp C as previously mentioned, is manually affixed to the pipe P for fittings which may be mounted on the pipe by causing the jaws 12 and 13 to engage same. The cable E if not already connected to the member M is affixed thereto by placing the terminal T to the bolt 24 as previously explained. Upon the welding operation being started an electric current flows through the cable E at terminal T to the bolt 24. From bolt 24 the current flows through the balls 19 to the outer ball race 18, and then to the metallic clamp C from which it passes to the pipe P. From experience it has been found that ball bearing assemblies 16 may be used in my device without fear of electric arcing taking place therein, as the weight of the cable C is sufficient to force the member M downwardly to maintain an electric circuit between the balls 19 and races 17 and 18 at all times. In the fabricating of my device it is essential that the materials used in forming the component parts thereof have electrical conducting properties to permit an electric current to flow from the cables E to the pipe P.

Although the above described form of my invention is fully capable of achieving the objects and providing the advantages hereinbefore mentioned, it is to be understood that it is merely illustrative of the presently preferred form of my device, and that I do not mean to limit myself to the details of construction herein described and shown other than as defined in the appended claims.

I claim:

1. An electrical grounding device which includes: a plate having jaws formed therein, with said jaws serving to removably affix said plate to the side walls of a pipe; a housing supported from said plate; a ball bearing assembly having an inner and outer race, with said outer race being supported in said housing and remaining fixed with relationship thereto; a member having a flanged end and a threaded portion extending through said inner race; a nut engaging said threaded portion and cooperating with said flange to grasp said inner race therebetween; a lock screw which engages a bore formed in said nut and threaded portion to hold said member and inner race together as an integral unit and prevent said flange coming in contact with said housing; a bolt extending outwardly from said threaded portion; and a nut engaging said bolt to hold the terminal of a cable in position thereon, with said terminal being situated between said nuts and hanging downwardly at all times irrespective of the rotation of said pipe to which said device is affixed.

2. An electrical grounding device which includes: a plate formed with a generally V-shaped notch extending inwardly from one edge of said plate whereby it may be removably affixed to the end portion of a pipe parallel to the longitudinal axis thereof; a housing supported from said plate; a ball bearing assembly having an inner and outer race, with said outer race being supported in said housing and remaining fixed with relationship thereto; a member having a flanged end and a threaded portion extending through said inner race; a nut engaging said threaded portion and cooperating with said flange to grasp said inner race therebetween; a lock screw which engages a bore formed in said nut and threaded portion to hold said member and inner race together as an integral unit and prevent said flange coming in contact with said housing; a bolt extending outwardly from said threaded portion; and a nut engaging said bolt to hold the terminal of a cable in position thereon, with said terminal being situated between said nuts and hanging downwardly at all times irrespective of the rotation of said pipe to which said device is affixed.

JOHN L. ELKINS.

References Cited in the file of this patent

UNITED STATES PATENTS

| Number | Name | Date |
|---|---|---|
| 1,598,617 | Missogenis | Sept. 7, 1926 |
| 1,673,086 | Lundberg | June 12, 1928 |
| 1,769,536 | Oak | July 1, 1930 |
| 2,086,784 | Taylor | July 13, 1937 |
| 2,176,137 | Jurkat | Oct. 17, 1939 |
| 2,399,823 | Phillips | May 7, 1946 |
| 2,475,051 | Raymond | July 5, 1949 |